United States Patent [19]
Garzelloni

[11] Patent Number: 6,035,998
[45] Date of Patent: Mar. 14, 2000

[54] DUAL SENSOR TRIGGER ASSEMBLY FOR LIVE ROLLER CONVEYORS

[75] Inventor: Thomas L. Garzelloni, Grand Haven, Mich.

[73] Assignee: Ermanco Incorporated, Spring Lake, Mich.

[21] Appl. No.: 09/037,897

[22] Filed: Mar. 10, 1998

[51] Int. Cl.[7] .................................................. B65G 13/06
[52] U.S. Cl. ....................................................... 198/781.06
[58] Field of Search ......................................... 198/781.06

[56] References Cited

U.S. PATENT DOCUMENTS

| | | |
|---|---|---|
| 3,420,355 | 1/1969 | DeGood et al. . |
| 3,537,568 | 11/1970 | Leach . |
| 3,724,642 | 4/1973 | DeGood . |
| 4,219,115 | 8/1980 | Moore ..................................... 198/781 |
| 4,392,568 | 7/1983 | Turnbough et al. . |
| 4,441,607 | 4/1984 | Bowman et al. . |
| 4,473,149 | 9/1984 | Vogt et al. ............................... 198/781 |
| 4,572,353 | 2/1986 | Felder . |
| 4,609,098 | 9/1986 | Morgan et al. . |
| 4,817,784 | 4/1989 | Judge . |
| 4,919,255 | 4/1990 | Morgan et al. . |
| 5,016,748 | 5/1991 | Garzelloni . |
| 5,191,967 | 3/1993 | Woltjer et al. . |
| 5,287,956 | 2/1994 | Collins et al. ........................... 198/781 |
| 5,316,130 | 5/1994 | Heit et al. . |
| 5,348,139 | 9/1994 | Szarkowski et al. . |
| 5,358,097 | 10/1994 | Bakkila et al. ......................... 198/781 |
| 5,429,225 | 7/1995 | Schiesser et al. . |
| 5,540,323 | 7/1996 | Schiesser et al. . |
| 5,582,287 | 12/1996 | Heit et al. . |
| 5,823,319 | 10/1998 | Resnick et al. ..................... 198/781.06 |

*Primary Examiner*—William E. Terrell
*Assistant Examiner*—Kenneth Bower
*Attorney, Agent, or Firm*—Cook, Alex, McFarron, Manzo, Cummings, & Mehler, Ltd.

[57] ABSTRACT

A trigger assembly for use with an accumulation conveyor includes two opposing pivot brackets. A pair of carrier-type roller extend between the pivot brackets and are respectively mounted for rotation about shafts that mount the pivot brackets to the side channels of the accumulation conveyor. Two sensing rollers extend between the pivot brackets and are respectively mounted for rotation about shafts that pivot about the shafts of the carrier-type roller during actuation and deactuation of the trigger assembly. A common counterweight roller is positioned between the first and second carrier-type rollers and is mounted on a shaft that pivotally connects the links of each of the pivot brackets to bias the sensing rollers upwardly into the travel path of the conveyor.

20 Claims, 4 Drawing Sheets

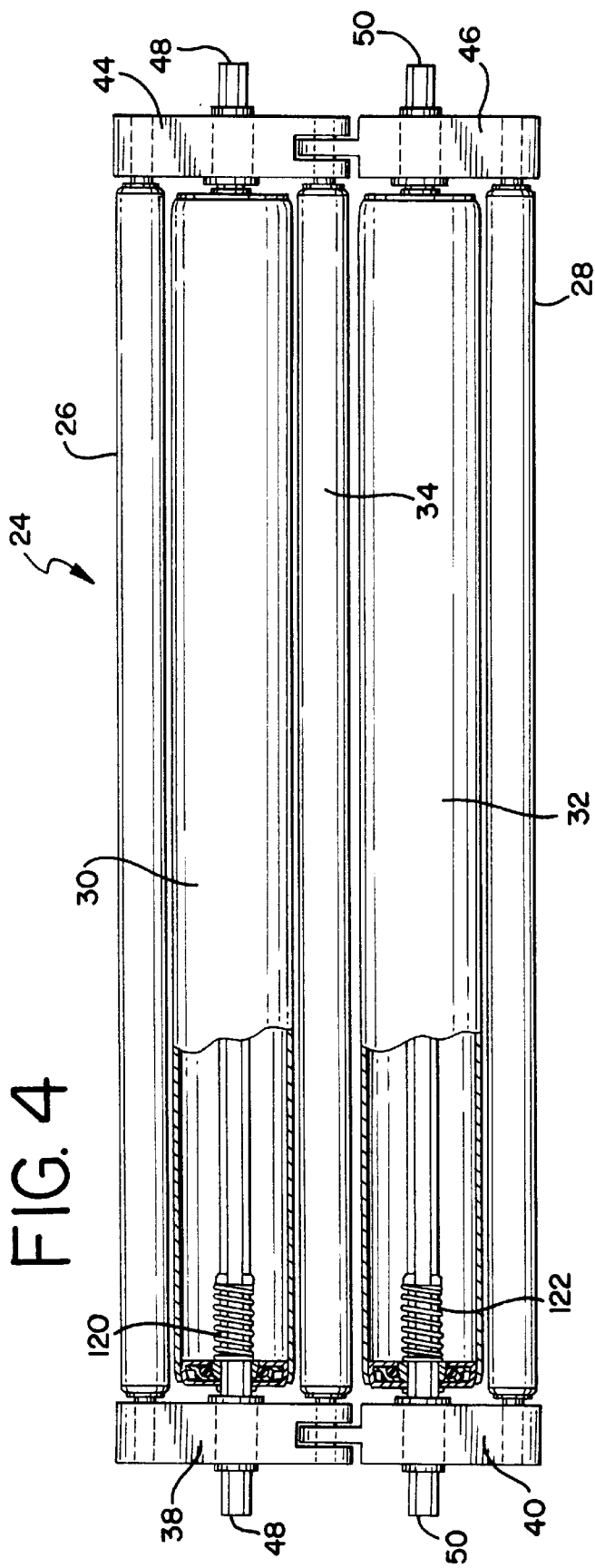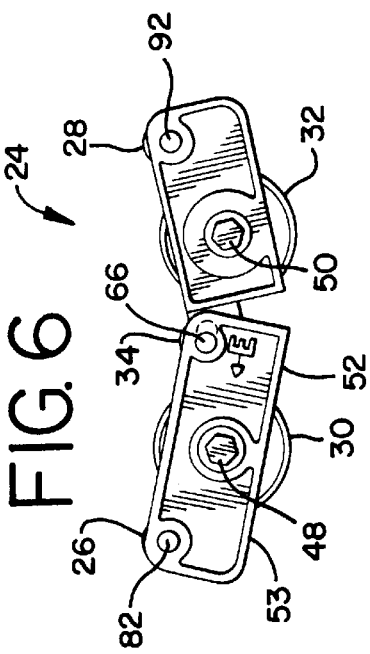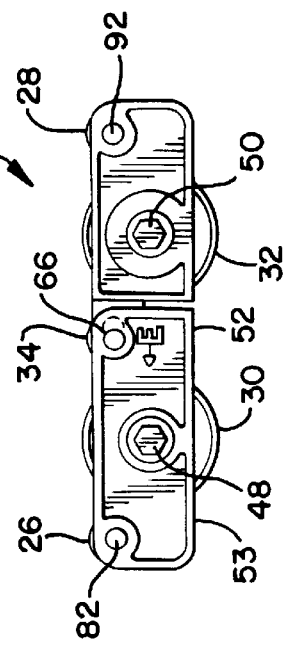

DUAL SENSOR TRIGGER ASSEMBLY FOR LIVE ROLLER CONVEYORS

BACKGROUND OF THE INVENTION

The present invention generally relates to live roller accumulation conveyors used to transport articles along a predetermined conveying path and, more particularly, to product-detecting trigger assemblies that can be advantageously used in zero pressure accumulation conveyors.

Live roller accumulation conveyors are well known in the art and have employed various mechanisms for controlling the drive to their powered carrier rollers to allow those carrier rollers to be selectively rotated or stopped to accommodate accumulation of the articles being conveyed. Typically, the carrier rollers are belt driven and convey the articles to a collection or accumulation location and, once one or more of the articles have reached that location or those locations, the power to an upstream group of carrier rollers is stopped to provide for accumulation.

One such conveyor and control mechanism is shown in my U.S. Pat. No. 5,016,748. That patent discloses an accumulation conveyor that includes a frame having two generally parallel sides. A plurality of carrier rollers are rotatably mounted between the parallel side frame members and are driven by a drive belt. A plurality of trigger assemblies are also mounted to the sides of the frame. Each trigger assembly includes two opposing pivot brackets pivotally mounted on each end of the shaft of a selected carrier roller, which forms the pivot axis for the trigger assembly. Each trigger assembly further includes a single sensing roller mounted on the opposing pivot brackets on one side of the trigger assembly pivot axis and a counterbalance roller, which is heavier than the sensing roller, is mounted on the opposite side of the trigger assembly pivot axis. The counterweight roller biases its associated sensing roller into the path of movement of articles transported along the conveyor bed. The trigger assembly actuates and deactuates a switch associated with an air valve for selective application of the drive belt to the carrier rollers upstream of the trigger assembly based upon the detection of articles by the sensing roller of the trigger assembly.

Although the trigger assembly disclosed in the aforementioned patent is suitable for use in the conveyance of many articles which are conveyed by conveyor systems, the assembly disclosed therein has a deficiency which is most apparent when the articles being conveyed by the accumulation conveyor have irregular bottom surfaces, tapered ends and/or flanges. These tapered ends and/or flanges of a conveyed article can produce gaps between a particular conveyed article and other conveyed articles during accumulation. On occasion, the irregular bottom surfaces or the gaps resulting from tapered ends and/or flanges allow the sensing roller of the single sensor trigger assembly disclosed in U.S. Pat. No. 5,016,748, to raise above the conveying surface even when an article is being conveyed thereover. In turn, the counterweight roller associated with that trigger assembly remains in its lowered position and does not actuate the switch of its associated air valve. This prevents the accumulation of articles in the zone immediately upstream from that trigger assembly and causes undesirable line pressure, thereby effectively eliminating the zero pressure accumulation characteristic of the conveyor.

Several attempts have been made to overcome this deficiency common to single sensor trigger assemblies. For example, a first common practice to overcome this deficiency has involved a mechanical linkage system that links two such single sensor trigger assemblies together. In this arrangement, when one of the trigger assemblies pivots, its linked trigger assembly also pivots. As a result, the switches of the air valves respectively associated with those trigger assemblies are actuated if either of the sensing rollers associated with those single sensor trigger assemblies detect the presence of an article.

This first solution to the deficiency common to ordinary single sensor trigger assemblies has been less than satisfactory because it requires the use of additional components to the conveyor system, thereby increasing production and maintenance costs of the system. Also, because, in this arrangement, a transported article must overcome the bias of two counterweight rollers, a conveyor system utilizing this potential solution is not well suited for accumulating lightweight articles. Moreover, this solution inherently decreases article throughput because the deactuation of each zone may be induced by the deactuation of its linked zone. In this regard, articles might be accumulated at alternating zones rather than at each zone.

Another solution to the deficiency of ordinary single sensor trigger assemblies is to pneumatically couple two or more of the air valves positioned in adjacent conveyor zones so that actuation of a switch associated with either air valve initiates the accumulation process for the other such valve.

This second solution requires additional pneumatic components in the conveyor system and therefore increases its production costs, maintenance costs and complexity. Moreover, this solution inherently decreases article throughput because the deactuation of each zone may be induced by the deactuation of its coupled zone. In this regard, articles might be accumulated at alternating zones rather than at each zone. As such, this second solution is not well suited for many uses.

A third known solution to overcome the deficiency of single sensor trigger assemblies is to replace mechanical trigger assemblies with optically actuated sensor assemblies, such as those that utilize one or more photo-electric sensors. The use of optical technologies, such as photo-electric sensors, however, increases the production and maintenance costs of a conveyor system. Furthermore, these systems are more complex and require more supervision. As such, this third solution is not well suited for many applications.

A zero pressure accumulation conveyor utilizing the dual sensor trigger assembly of the present invention overcomes the aforementioned disadvantages of the prior art. In particular, a zero pressure accumulation conveyor utilizing a trigger assembly constructed in accordance with the principles of the present invention eliminates concern with regard to the conveyance of articles having irregular bottom surfaces, tapered ends and/or flanges. Such a trigger assembly is safe and quiet in operation and simple in construction, thereby substantially minimizing the production and maintenance costs of a conveyor system utilizing this technology. The present invention is much less complex than the aforementioned solutions to the deficiency common to ordinary single sensor trigger assemblies. As such, the present invention represents a cost efficient and effective solution to this problem.

In accordance with an important aspect of the present invention, the dual sensor trigger assembly of the present invention is a single assembly having two sensing rollers which share a common counterweight. Two carrier-type rollers are included as component parts of the trigger assembly and both are positioned adjacent to their respectively associated sensing rollers so that the shaft of each provides a pivot axis for its associated sensing roller. The pivoting of either sensing roller about the shaft of its adjacent carrier-type roller during reciprocation of the sensing roller between its biased position and its loaded position elevates or lowers the common counterweight and removes or exerts pressure from or on the actuating switch (e.g. air valve actuator in pneumatically controlled systems) associated with the trigger assembly. This deactuates or actuates the power to upstream carrier rollers to initiate or conclude an accumulation cycle, as the case may be.

SUMMARY OF THE INVENTION

The present invention is directed to a trigger assembly for use with an accumulation conveyor. The accumulation conveyor may be of the conventional type having a frame with first and second side channels. Carrier rollers are mounted for rotation between the first and second side channels to define a travel path for articles transported longitudinally along a conveyor bed of the accumulation conveyor.

The trigger assembly, which forms the subject matter of the present invention, includes first and second opposing pivot brackets. A first carrier roller extends generally between a first link of the first pivot bracket and a first link of the second pivot bracket. The first carrier roller is rotatably supported on a shaft mounted to the first and second side channels.

A second carrier roller extends generally between a second link of the first pivot bracket and a second link of the second pivot bracket. The second carrier roller is also rotatably supported on a shaft mounted between the first and second side channels.

The trigger assembly further includes a first sensing roller that extends generally between the first links of the first and second pivot brackets. The first sensing roller is mounted for rotation about a shaft that is positioned to pivot about the shaft of the first carrier roller during actuation and deactuation of the trigger assembly when the shafts of the first and second carrier rollers are mounted to the side channels of the accumulation conveyor.

The trigger assembly also includes a second sensing roller that extends generally between the second links of the first pivot and second pivot brackets. The second sensing roller is mounted for rotation about a shaft that is positioned to pivot about the shaft of the second carrier roller during actuation and deactuation of the trigger assembly once the shafts of the first and second carrier rollers are mounted to the first and second side channels of the accumulation conveyor, respectively.

The trigger assembly further includes a common counterweight positioned between the first and second carrier rollers. The common counterweight is mounted on a shaft that pivotally connects the first link of the first pivot bracket to the second link of the first pivot bracket and the first link of the second pivot bracket to the second link of the second pivot bracket to bias the first and second sensing rollers upwardly into the travel path when the shafts of the first and second carrier rollers are mounted to the side channels of the accumulation conveyor.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 4 is a top plan view of a trigger assembly constructed in accordance with the principles of the present invention;

FIG. 5 is an end view of the trigger assembly of FIG. 4 wherein the trigger assembly is shown in its loaded position wherein the sensing rollers are lowered;

FIG. 6 is an end view of the trigger assembly of FIG. 4 shown in its biased position wherein the sending rollers are raised.

DETAILED DESCRIPTION OF THE PREFERRED EMBODIMENTS

Figure 1:
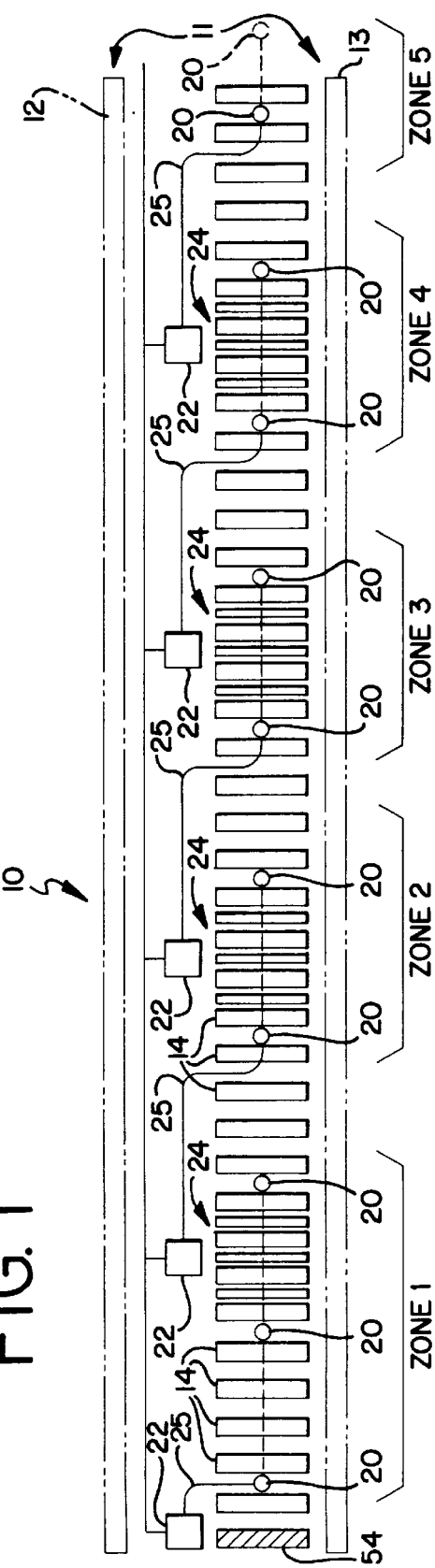
FIG. 1 is a schematic illustration of the top view of an accumulation conveyor system incorporating trigger assemblies constructed in accordance with the principles of the present invention.
Figure 2:
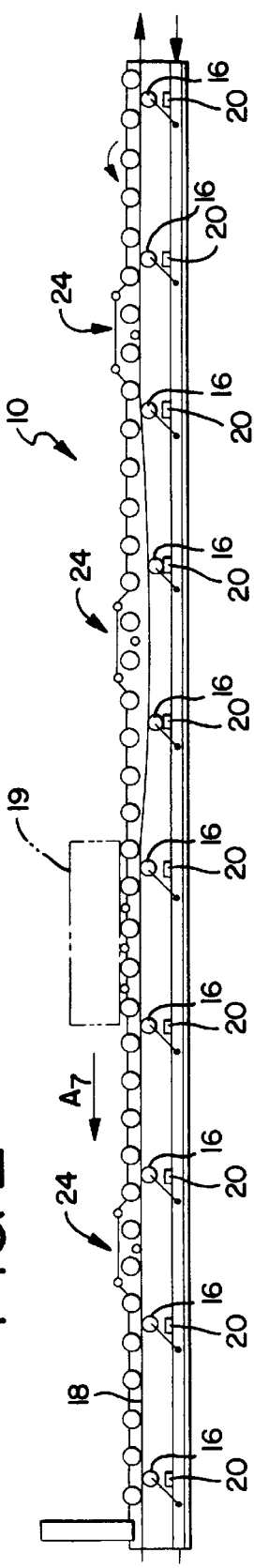
FIG. 2 is a schematic illustration of the side view of the accumulation conveyor of FIG. 1.

Referring generally to FIGS. 1–7, and first more particularly to FIGS. 1 and 2, an accumulation conveyor system generally designated 10 is shown. As is conventional, the accumulation conveyor 10 includes a frame 11 having two generally parallel extending side channels 12, 13 that define the width of the conveyor bed. The accumulation conveyor 10 is of the belt-driven live roller type and, as such, includes a plurality of transverse, powered carrier rollers 14, each of which is supported by the side channels 12, 13 for rotation about its shaft 15 (see FIG. 3) on which it is mounted. The conveyor bed is defined by the plane extending tangentially across the radially upwardmost surface of each carrier roller 14. This conveyor bed defines a conveying path line along which conveyed articles are propelled in a direction indicated by the arrow A in FIG. 2.

A plurality of lifting rollers 16 are mounted between the side channels 12, 13 of frame 11 beneath the carrier rollers 14. A drive belt 18 extends between the carrier rollers 14 and the lifting rollers 16. In this relationship, the drive belt 18 is able to rotate the carrier rollers 14 about their shafts 15 in response to the lifting rollers 16 lifting the belt into engagement with the bottom surface of the carrier rollers. Those skilled in the art will appreciate that drive belt 18 may be driven by a conventional drive mechanism of the type typically used in belt-driven live roller conveyor systems. The belt 18 is preferably continuous in its upper run and extends longitudinally along the path of the conveyor bed to rotate the carrier rollers 14 about their respective shafts 15 when placed into contact with the bottom surface of those rollers. When lifted, drive belt 18 causes articles, such as package 19, to transport downstream along the conveyor bed.

In the illustrated embodiment, each lifting roller 16 is associated with a pneumatic bladder-type lifting device 20 which is actuated to cause lift of its associated lifting roller into engagement with drive belt 18 to move the belt into engagement with the bottom surface of the carrier rollers 14. As shown, the conveyor is divided into a plurality of zones which are numbered consecutively in an upstream direction. An air valve 22 is pneumatically connected to each pneumatic bladder-type lifting device 20 in the immediately adjacent upstream zone. Each air valve 22 is positioned under a trigger assembly generally designated 24, the latter of which is constructed in accordance with the principles of the present invention. The pneumatic control system for conveyor 10 is such that each air valve 22 and its associated trigger assembly 24 are effective to inflate or deflate the pneumatic bladder-type lifting devices 20 and, in turn, raise or lower the lifting rollers 16 located in the immediately adjacent upstream zone. In particular, air lines 25 connect each air valve 22 with the pneumatic bladder-type lifting devices 20 located in that zone.

Those skilled in the art will appreciate that when trigger assembly 24 is in its biased position, such as that shown in FIG. 6, the pneumatic bladder-type lifting devices 20 and the lifting rollers 16 in the immediately upstream conveyor zone are actuated to raise the drive belt 18 into engagement with the carrier rollers 14 mounted in that zone, regardless of whether the conveyor 10 is in its transportation mode or its accumulation mode.

Figure 3:
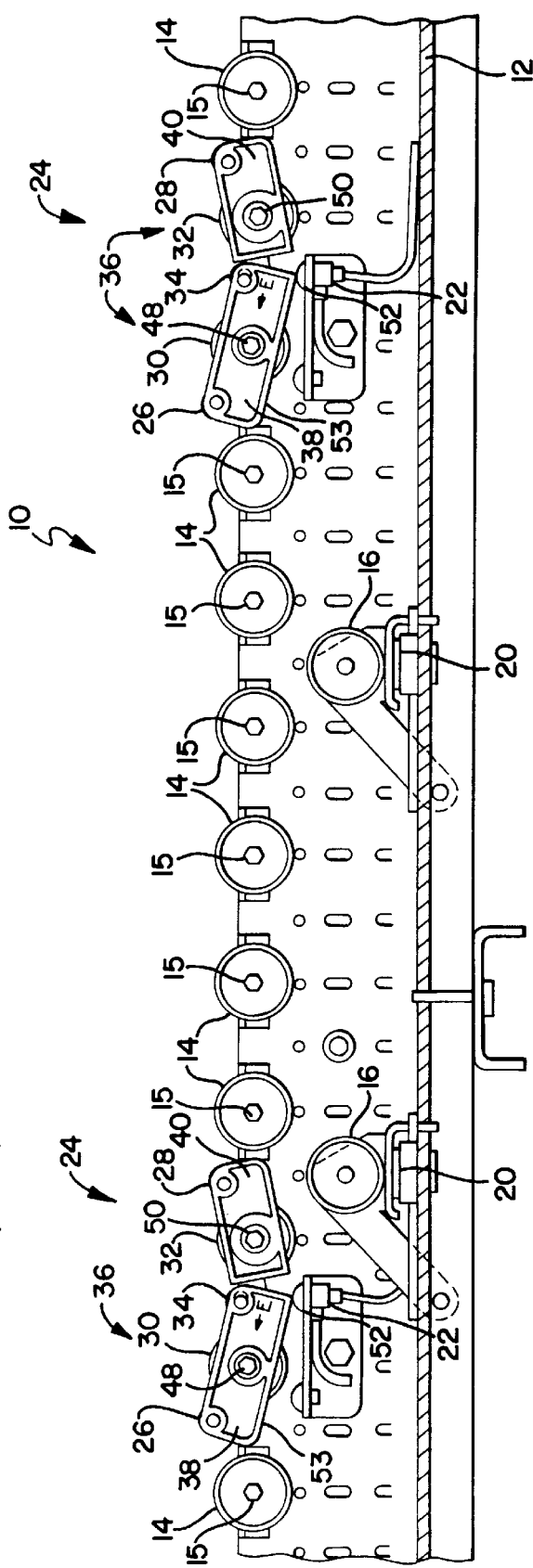
FIG. 3 is a side elevational view of an accumulation conveyor that utilizes trigger assemblies constructed in accordance with the principles of the present invention.
Figure 7:
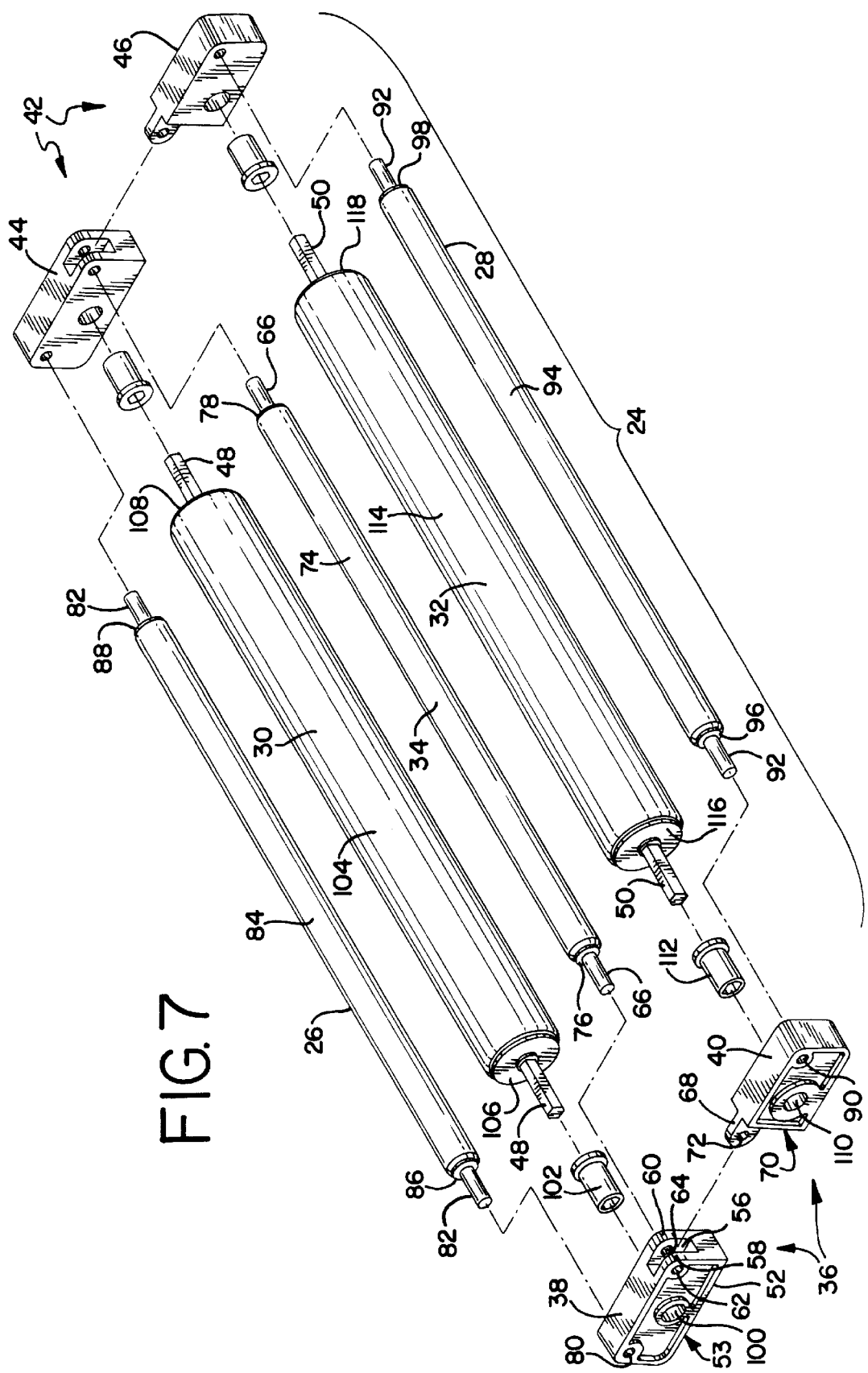
FIG. 7 is an exploded perspective view of the trigger assembly of FIG. 4.

Referring now to FIG. 3, each trigger assembly 24 includes a pair of sensing rollers 26, 28, a pair of carrier-type rollers 30, 32, and a common counterweight roller 34. Each trigger assembly further includes a first pivot bracket generally designated 36 having a first link 38 which is pivotally or hingedly connected to a second link 40. It will be seen and understood that the construction of this trigger assembly on one side of the conveyor bed is duplicated on the opposite side of the conveyor bed. As such, trigger assembly 24 includes a second pivot bracket generally designated 42 having a first link 44 which is pivotally connected to a second pivot link 46 (FIG. 7).

Carrier-type roller 30 is mounted for rotation on a shaft 48 that extends between and through first and second female pivot brackets 38, 44. Shaft 48 is sized and shaped for mounting to the side channels 12, 13 of frame 11 (FIG. 1). Similarly, carrier-type roller 32 is mounted for rotation on a shaft 50 that extends between and through the first and second male pivot brackets 40, 46. Shaft 50 is sized and shaped for mounting to the two side channels 12, 13 of frame 11.

Still referring to FIG. 3, sensing roller 26 extends between and through the first and second female pivot brackets 38, 44. Unlike its associated carrier-type roller 30, sensing roller 26 is not mounted to the side channels 12, 13 of frame 11. During operation of trigger assembly 24, sensing roller 26 pivots about the shaft 48 of carrier-type roller 30. Similar to sensing roller 26, sensing roller 28 extends between and through first and second male pivot brackets 40, 46 and is not mounted to the side channels 12, 13 of frame 11. During operation of trigger assembly 24, sensing roller 28 pivots about the shaft 50 of carrier-type roller 32, which is mounted to the side channels of frame 11.

As will be explained in greater detail with reference to FIG. 7, common counterweight roller 34 extends between the first and second pivot brackets 36, 42 at the location at which the first and second links of each are pivotally connected. Similar to sensing rollers 26, 28, common counterweight roller 34 is not mounted to the side channels of frame 11. Common counterweight roller 34 biases the sensing rollers 26, 28 upwardly into the conveying path of transported articles. In doing so, common counterweight roller 34 pivots the first link 38 in a clockwise direction, as viewed in FIG. 3, so that an actuating surface 52 positioned on the bottom face 53 thereof actuates the air valve 22 positioned underneath trigger assembly 24.

When a transported article, such as package 19 (FIG. 2), travels over a trigger assembly 24, at least one of the sensing rollers 26, 28 of that assembly is depressed to cause both sensing rollers to pivot about the shafts 48, 50 of their respective adjacent carrier-type rollers 30, 32. This pivoting, in turn, causes common counterweight roller 34 to be elevated so that the actuating surface 52 of the first female pivot bracket 38 is lifted from a switch actuator associated with the air valve 22 positioned below trigger assembly 24. When this occurs, the trigger assembly 24 is said to be in its loaded position. As a result of these actions, the pneumatic bladder-type devices 20 in the immediately adjacent upstream zone are deflated to lower lifting rollers 16 and remove drive belt 18 from the bottom surface of the carrier rollers 14 in that zone.

When the conveyor is in a continuous transportation mode, and the conveyor is empty with no articles thereon, the sensing rollers 26, 28 for each trigger assembly 24 are biased upwardly into the path of the movement of articles by their associated common counterweight roller 34. Further, the biased position of the common counterweight roller causes the actuating surface 52 of each female pivot bracket 38 to depress an actuator switch associated with each air valve 22. Once each air valve 22 is actuated, its coupled pneumatic bladder-type devices 20 in the immediately adjacent upstream zone are inflated to raise the lifting rollers 16 of that zone and bring the drive belt 18 into engagement with the bottom surface of the carrier rollers 14 of that zone, thereby imparting drive to the carrier rollers. When every lifting roller 16 of conveyor system 10 is raised, the drive belt 18 is in contact with all of the carrier rollers 12.

If articles are placed on the in-feed end of the conveyor, i.e., the right-hand side as viewed in FIG. 1, the articles are transported down the conveyor bed as a result of the direct drive imparted to all carrier rollers 14 by drive belt 18. When a transported article approaches and depresses a sensing roller 26, 28 for one of the trigger assemblies 24, the actuating surface 52 is removed from the switch actuator of its associated air valve 22, causing deactuation of the air valve. As a result, the air valve bleeds air from its coupled pneumatic bladder-type devices 20, which are positioned in the zone immediately upstream of the air valve and the drive belt 18 is removed from the carrier rollers 14 of that zone.

As the transported article is conveyed past the sensing rollers 26, 28, those sensing rollers are no longer depressed by the transported article and the common counterweight roller 34 drops as a result of gravitational force so that the actuating surface 52 of the first female pivot bracket 38 depresses the switch actuator associated with air valve 22, causing actuation of that air valve. When air valve 22 is actuated, its coupled pneumatic bladder-type devices 20 located in the zone immediately upstream are inflated to cause their associated lifting rollers 16 to raise the drive belt 18 into contact with the bottom surface of the carrier rollers 14 located in that zone. This action continues as each sensing roller 26, 28 associated with each trigger assembly 24 is depressed. The result is article movement in a singulated mode along the length of the conveyor bed.

To place the conveyor system 10 in its accumulation mode, a stop device 54 (FIG. 1) may be activated to impede the forward movement of transported articles. When the stop device 54 is activated, the pneumatic bladder-type devices 20 in the first zone are deflated to lower drive belt 18 from contact with the bottom surface of the carrier rollers 14 in that zone. In this regard, any transported articles will come to rest just upstream of the stop device 54.

When one of the sensing rollers 26, 28 associated with the air valve 22 positioned in the first zone is depressed, the air valve is caused to be deactuated so that it bleeds air from the pneumatic bladder-type devices 20 in the second zone, which is located upstream of the first zone. This deflation of the second zone bladders 20, in turn, causes the lifting rollers 16 of that zone to drop as a result of gravitational force. Consequently, the drive belt 18 is removed from the bottom surface of the carrier rollers 14 positioned in the second zone. This same accumulation procedure occurs seriatim longitudinally along the conveyor bed in an upstream direction as articles continue to be transported down the conveyor bed toward the accumulated articles. once all trigger assemblies 24 have at least one of their sensing rollers 26, 28 depressed by an accumulated article, all air valves 22 are deactuated to cause their coupled pneumatic bladder-type devices 20 to be deflated which, through a series of actions, eliminates all line pressure along the conveying path.

In order to re-initiate the transportation mode, the stop device 54 is removed so that its associated air valve 22 is actuated to cause inflation of the pneumatic bladder-type devices 20 located in the first zone. Once those pneumatic bladder-type devices are inflated, the lifting rollers 16 of the first zone are raised to cause drive belt 18 to contact the bottom surface of the carrier rollers 14 located in that zone, thereby imparting drive to those carrier rollers. This, in turn, causes the articles accumulated on the trigger assembly 24 of the first zone to be conveyed downstream and removed from that trigger assembly so that the trigger assembly may reassume its biased position. As such, the common counterweight roller 34 of the first zone trigger assembly 24 drops downwardly due to the exertion of gravitational force and causes the actuating surface 52 of its first female pivot bracket 38 to come into contact with the actuator switch associated with the air valve 22 of the first zone. This actuates the air valve 22 of the first zone and causes inflation of its coupled pneumatic bladder-type devices 20, which are located in the second zone.

When the pneumatic bladder-type devices located in the second zone are inflated, the drive belt 18 is placed into contact with the bottom surface of the carrier rollers 14 of the second zone to impart drive to them and to remove any accumulated articles from the sensing rollers 26, 28 of the trigger assembly 24 located in the second zone. The common counterweight roller 34 for the trigger assembly 24 located in the second zone then drops due to the exertion of gravitational force to cause the actuating surface 52 of the first female pivot bracket 38 of that trigger assembly to actuate the actuator switch associated with the air valve 22 located immediately underneath the trigger assembly. This actuation of the actuator switch associated with air valve 22 causes actuation of that air valve and induces inflation of the pneumatic bladder-type devices 20 located in the third zone. This same procedure occurs seriatim longitudinally along the conveyor bed in an upstream direction as articles are once again transported in a downstream direction.

Referring now to FIGS. 4–7, the present invention is directed to the trigger assemblies 24 spaced longitudinally along the conveyor bed. Each trigger assembly 24 is mounted to the side channels 11, 12 of frame 13. In that regard, the shafts 48, 50 of the carrier-type rollers 30, 32 of each trigger assembly 24 are sized to permit mounting of the trigger assembly to side channels 11, 12.

As shown in FIG. 7, each trigger assembly 24 includes the first pivot bracket 36 having the first link 38 and second link 40 pivotally coupled to each other. In the illustrated embodiment, the actuating surface 52 is positioned on the bottom panel 53 of the first link 38 and, as shown, link 38 is larger than link 40 to accommodate the actuating surface 52. The first link 38 includes a female slot or cavity 56 defined by lugs 58, 60 positioned generally inwardly and upwardly with respect to the assembled trigger assembly 24. Lug 58 includes a cavity or bore 62 extending therethrough. Similarly, lug 60 includes a cavity or bore 64 extending therethrough. Cavities 62, 64 are sized to receive the shaft 66 of the common counterweight roller 34.

Cavity 56 is sized to accommodate a tab 68 extending from the inside panel 70 of second link 40. Tab extension 68 includes a bore 72 extending therethrough which is sized and shaped to receive the shaft 66 of common counterweight roller 34. When tab extension 68 is seated within the slotted cavity 56, bore 72 of the tab extension is in registration with bores 62, 64 and shaft 66 of common counterweight roller 34 is received therethrough. Shaft 66 of common counterweight roller 34 thereby serves as a pivot point for the trigger assembly 24 as the trigger assembly reciprocates between its loaded position (FIG. 5) and its biased position (FIG. 6) during operation of conveyor system. The common counterweight roller 34 includes a generally tubular surface 74 and two bearings 76, 78. In certain applications, counterweight 34 can be a non-rotating counterweight. Common counterweight roller 34 is mounted on its shaft 66.

The first link 38 of pivot bracket 36 also includes a cavity or bore 80 that is sized and shaped to accommodate shaft 82 of sensing roller 26. As such, shaft 82 of sensing roller 26 is permitted to fit within and extend through female pivot bracket 38. Sensing roller 26 includes a generally tubular rolling surface 84 and two end caps 86, 88. Sensing roller 26 is mounted to its shaft 82 for rotation. Similarly, second link 40 of pivot bracket 36 includes a cavity or bore 90 sized and shaped to accommodate shaft 92 of sensing roller 28. As such, shaft 92 is permitted to fit in and extend through the second link 40 of pivot bracket 36. Sensing roller 28 is rotatably mounted to shaft 92 and includes a generally tubular rolling surface 94 and two end caps 96, 98.

The first link 38 of pivot bracket 36 also includes another cavity or bore 100 which is sized to receive a bushing 102 which, in turn, accommodates shaft 48 of carrier-type roller 30. As such, shaft 48 of carrier-type roller 30 is permitted to fit within and extend through bushing 102 and cavity 100. Shaft 48 of carrier-type roller 30 is designed to permit mounting of trigger assembly 24 to one of the side channels 12, 13 of the conveyor system frame 11 (FIG. 1). As shown in the illustrated embodiment, shaft 48 of carrier-type roller 30 has a hexagonal surface shape although other surface shapes can be used if desired. Carrier-type roller 30 is rotatably mounted on shaft 48 and includes a generally tubular rolling surface 104 and two bearings 106, 108.

In a similar fashion, the second link 40 of pivot bracket 36 also includes a cavity or bore 110 which is sized and shaped to receive a bushing 112 which, in turn, is sized and shaped to accommodate shaft 50 of carrier-type roller 32. As such, shaft 50 of carrier-type roller 32 is permitted to fit within and extend through bushing 112 and cavity 110 of first male pivot bracket 40. Again, shaft 50 is sized and shaped to permit proper mounting of trigger assembly 24 to the side channels 12, 13 of the conveyor system frame 11 (FIG. 1). Carrier-type roller 32 is rotatably mounted on shaft 50 and includes a generally tubular rolling surface 114 and two bearings 116, 118.

As will be seen and understood, construction of this trigger assembly 24 on one side is duplicated on the other side of the conveyor bed so that each of the rollers is similarly supported by first and second links 44, 46 of second pivot bracket 42.

Referring briefly to FIG. 4, carrier-type rollers 30, 32 are shown to include springs 120, 122 which facilitate the mounting of those carrier-type rollers to their respective shafts 48, 50 and further facilitate assembly of those carrier-type rollers within trigger assembly 24.

Although the present invention has been described by reference to a certain preferred embodiment, it should be understood that this preferred embodiment is merely illustrative of the principles of the present invention. Therefore, modifications and/or changes may be made by those skilled in the art without departing from the true spirit and scope of the invention as defined by the appended claims.

For example, while dual sensor trigger assembly of the present invention has been described in association with a pneumatically controlled live roller accumulation conveyor, it will be appreciated that it may be advantageously employed in other live roller conveyor systems, such as, for example, electrically and hydraulically controlled live roller conveyor systems.

Correspondingly, the present invention may be used with other types of accumulation conveyors such as line shaft conveyors and those accumulation conveyors having roller brackets that permit mounting of both the switch of the air valve associated with the trigger assembly and the guide for the drive belt. In the arrangement of these brackets, the valve and drive belt work in harmony with each other during operation of the accumulation conveyor system. A conventional diaphragm is mounted on a support shelf of the bracket.

During the non-accumulation mode of this type of accumulation conveyor, the diaphragm is inflated to pivot the bracket upwardly and raise the belt so that it obtains and maintains contact with the bottom surface of the carrier rollers. Simultaneously, the bracket raises the switch of the air valve to drive the common counterweight roller upwardly and retract the sensing rollers below the driven carrier rollers. Conversely, when the accumulation conveyor is in its zero pressure accumulation mode, the diaphragm is deflated to pivot the bracket downwardly and lower the belt so that it releases from contact with the bottom surface of the carrier rollers. At that same time, the common counterweight roller moves vertically downward at the same rate of descent as the belt so that it maintains contact with the switch of the air valve fixedly mounted to the bracket. As the common counterweight roller drops, the pivot brackets of the trigger assembly pivot and cause the first and second sensing rollers to rise above the conveying surface.

I claim:

1. A trigger assembly for use with an accumulation conveyor having a frame with first and second side channels and carrier rollers rotatably mounted generally between said side channels to define a travel path for articles transported longitudinally along a conveyor bed of said accumulation conveyor, said trigger assembly comprising:

a first pivot bracket said first pivot bracket including first and second pivotally connected links;

a second pivot bracket opposing said first pivot bracket said second pivot bracket including first and second pivotally connected links;

a first shaft extending generally between said first link of said first pivot bracket and said first link of said second pivot bracket, said first shaft being adapted to be mounted to the first and second side channels;

a second shaft extending generally between said second link of said first pivot bracket and said second link of said second pivot bracket, said second shaft being adapted to be mounted to the first and second side channels;

a first sensing member extending generally between said first links of said first and second pivot brackets, said first sensing member being positioned to pivot about said first shaft during actuation and deactuation of said trigger assembly when said first shaft is mounted to said first and second side channels of said accumulation conveyor;

a second sensing member extending generally between said second links of said first and second pivot brackets, said second sensing member being positioned to pivot about said second shaft during actuation and deactuation of said trigger assembly when said second shaft is mounted to said first and second side channels of said accumulation conveyor; and a common counterweight positioned between said first and second shafts, one end of said common counterweight being connected to said first and second links of said first pivot bracket and another end of said common counterweight being connected to the first and second links of said second pivot bracket to bias said first and second sensing members upwardly into said travel path when said first and second shafts are mounted to said first and second side channels of said accumulation conveyor.

2. The trigger assembly as defined in claim 1 wherein a first roller is rotatably mounted about said first shaft between said first links of said first and second pivot brackets.

3. The trigger assembly as defined in claim 2 wherein said first roller is a carrier roller.

4. The trigger assembly as defined in claim 1 wherein a second roller is rotatably mounted about said second shaft between said second links of said first and second pivot brackets.

5. The trigger assembly as defined in claim 4 wherein said second roller is a carrier roller.

6. The trigger assembly as defined in claim 1 wherein said one of the first and second links of the first pivot bracket comprises a female connector and the other of the first and second links of the first bracket comprises a male connector.

7. The trigger assembly as defined in claim 6 wherein said female connector comprises a bottom panel that includes an actuating surface for causing selective actuation of a switch of an air valve associated with said trigger assembly.

8. A trigger assembly for use with an accumulation conveyor having a frame with first and second side channels and carrier rollers rotatably mounted generally between said side channels to define a travel path for articles transported longitudinally along a conveyor bed of said accumulation conveyor, said trigger assembly comprising:

a first pivot bracket said first pivot bracket including first and second pivotally connected links;

a second pivot bracket opposing said first pivot bracket said second pivot bracket including first and second pivotally connected links;

a first carrier roller extending generally between said first link of said first pivot bracket and said first link of said second pivot bracket, said first carrier roller being rotatably mounted about a first shaft that is adapted for mounting said first links of said first and second pivot brackets to the first and second side channels;

a second carrier roller extending generally between said second link of said first pivot bracket and a second link of said second pivot bracket, said second carrier roller being rotatably mounted about a second shaft that is adapted for mounting said second links of said first and second pivot brackets to the first and second side channels;

a first sensing roller extending generally between said first links of said first and second pivot brackets, said first sensing roller being positioned to pivot about said first shaft during actuation and deactuation of said trigger assembly when said first shaft is mounted to said first and second side channels of said accumulation conveyor;

a second sensing roller extending generally between said second links of said first and second pivot brackets, said second sensing roller being positioned to pivot about said second shaft during actuation and deactuation of said trigger assembly when said second shaft is mounted to said first and second side channels of said accumulation conveyor; and a common counterweight roller positioned between said first and second carrier rollers, one end of said common counterweight roller being pivotally connected to said first and second links of said first pivot bracket and another end of said common counterweight roller being pivotally connected to said second pivot bracket to bias said first and second sensing rollers upwardly into said travel path when said first and second shafts are mounted to said first and second side channels of said accumulation conveyor.

9. The trigger assembly as defined in claim 8 wherein one of the first and second links of the first pivot bracket comprises a female connector and the other of the first and second links of the first bracket comprises a male connector.

10. The trigger assembly as defined in claim 8 wherein said female connector comprises a bottom panel that includes an actuating surface for causing selective actuation of a switch of an air valve associated with said trigger assembly.

11. The trigger assembly as defined in claim 8 wherein said first link of the first pivot bracket includes a cavity sized and shaped to receive a shaft of the first sensing roller.

12. The trigger assembly as defined in claim 8 wherein said first link of the first pivot bracket includes a cavity sized and shaped to receive said first shaft of the first roller.

13. The trigger assembly as defined in claim 8 wherein one said first and second links of the first pivot bracket includes first and second lugs that define a cavity that is sized and shaped to receive a tab extension on the other of said first and second links of the first pivot bracket.

14. The trigger assembly as defined in claim 13 wherein said first lug includes a cavity sized and shaped to receive a shaft of the common counterweight roller.

15. A trigger assembly for use with an accumulation conveyor having a frame with first and second side channels and carrier rollers rotatably mounted generally between said side channels to define a travel path for articles transported longitudinally along a conveyor bed of said accumulation conveyor, said trigger assembly comprising:

a first pivot bracket including first and second pivotally connected links, one of said links having an actuating surface for selective actuation of a switch of an air valve associated with said trigger assembly;

a second pivot bracket including first and second pivotally connected links;

a first sensing roller extending generally between and supported by the first links of said first and second pivot brackets;

a second sensing roller extending generally between and supported by the second links of said first and second pivot brackets;

a first roller shaft extending generally between said first links of said first and second pivot brackets;

a first carrier-type roller rotatably mounted about said first roller shaft;

a second roller shaft extending generally between said second links of said first and second pivot brackets;

a second carrier-type roller rotatably mounted about said second roller shaft; and, a common counterweight roller positioned between said first and second roller shafts, said common counterweight roller providing the pivotal connection of said first and second links of said first pivot bracket and said first and second links of said second pivot bracket to bias said first and second sensing rollers upwardly into said travel path when said first and second roller shafts are mounted to said first and second side channels of said accumulation conveyor.

16. The trigger assembly as defined in claim 15 wherein the pivotal connection of said first and second links of said first pivot bracket comprises a hinge.

17. The trigger assembly as defined in claim 15 wherein said first link of the first pivot bracket includes a cavity sized and shaped to receive a shaft of the first sensing roller.

18. The trigger assembly as defined in claim 15 wherein said first link of the first pivot bracket includes a cavity sized and shaped to receive said first shaft of the first roller.

19. The trigger assembly as defined in claim 15 wherein one said first and second links of the first pivot bracket includes first and second lugs that define a cavity that is sized and shaped to receive a tab extension on the other of said first and second links of the first pivot bracket.

20. The trigger assembly as defined in claim 19 wherein said first lug includes a cavity sized and shaped to receive a shaft of the common counterweight roller.

\* \* \* \* \*